United States Patent [19]
Grosseau

[11] 3,714,841
[45] Feb. 6, 1973

[54] TELESCOPIC DEVICE FOR TRANSMITTING ROTARY MOVEMENT

[75] Inventor: Albert Grosseau, Chaville, France

[73] Assignee: Societe Anonyme Automobiles Citroen, Paris, France

[22] Filed: April 1, 1971

[21] Appl. No.: 130,256

[30] Foreign Application Priority Data

April 3, 1970 France...............................7012204

[52] U.S. Cl....................................................74/492
[51] Int. Cl. ...............................................B62d 1/18
[58] Field of Search.................................74/492, 493

[56] References Cited

UNITED STATES PATENTS 3,457,799 7/1969 Lucas et al. ............................74/492
3,486,396 12/1969 Toshioka et al. ......................74/492

FOREIGN PATENTS OR APPLICATIONS 1,126,071 9/1968 Great Britain..........................74/492

*Primary Examiner*—Milton Kaufman
*Attorney*—Curtis Morris & Safford

[57] ABSTRACT

This invention relates to a telescopic device for transmitting rotary movement, utilizable in particular for the steering column of a vehicle, comprising a sleeve, a shaft inside the sleeve and sliding with respect to this latter and a lining made of deformable material disposed between the sleeve and the shaft and fixed to one of these two elements, a sufficient clearance being provided between the zones opposite the sliding members in order to avoid requirement for their adjustment, wherein the clearance is eliminated over a portion of the zones opposite the lining and the element sliding with respect thereto, this ensuring a localized assembly with locking due to a deformation upon assembly of the lining.

5 Claims, 4 Drawing Figures

TELESCOPIC DEVICE FOR TRANSMITTING ROTARY MOVEMENT

The present invention relates to devices transmitting under torque to rotary movement of a driving element to a driven element, these two aligned elements being able to slide axially with respect to one another.

Such devices are applied in particular in steering columns in automobile vehicles, either for adjusting the position of the steering wheel or as safety device associated, moreover, with means absorbing the kinetic energy when a shock occurs.

The operation of heretofore used devices is imperfect. Among other disadvantageous effects, a disagreeable sensation of insecurity is noticed when the vehicles are used in certain ways. Therefore, the driver who has to make alternate movements for turning in two different directions, in a first direction begins to turn only after having taken up the play existing in the coupling of the male and female elements of the transmission of rotation, i.e., only after a certain response time, which is not good, while, in the opposite direction, he obtains an immediate response which will also give him a disagreeable surprise compared with the response obtained during the maneuver made in the first direction of rotation.

The invention intends to remedy these drawbacks and to this end proposes a new telescopic transmission of rotary movement suitable, of course, for being used in steering columns of vehicles and also for constituting other couplings, possibly in fields other than the technique of vehicles.

The invention therefore has for its object a telescopic device for transmitting rotary movement, utilizable in particular for the steering column of a vehicle, comprising a sleeve, a shaft inside the sleeve and sliding with respect to this latter and a lining made of deformable material disposed between the sleeve and the shaft, and fixed to one of these two elements, a sufficient clearance being provided between the zones opposite the sliding members in order to avoid requirement for their being adjusted.

In this device, the clearance is eliminated over a portion of the zones opposite the lining and the element sliding with respect thereto, this ensuring a localized assembly with locking thanks to a deformation upon assembly of the cover.

A variation of one of the dimensions of at least one of the two members, lining or element sliding with respect thereto, with respect to the corresponding dimension of the other of these two members, advantageously produces said localized assembly with locking.

The element sliding with respect to the lining having a flat surface, the lining preferably also has a flat surface disposed so as to correspond with that of said element and extending by a facet converging towards the axis of said lining.

In addition, the lining is advantageously made from an elastic material, in a manner known per se.

The invention will be described in greater detail with reference to the accompanying drawings, in which.

Figure 4:
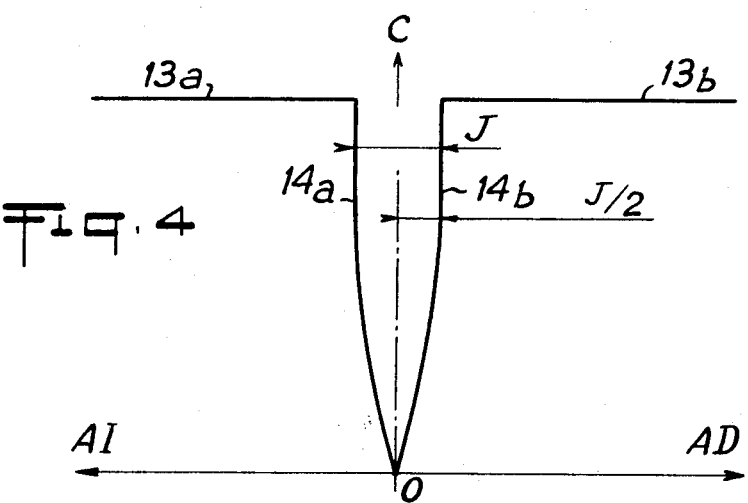

FIG. 4 schematically shows the mode of utilization of a device made according to the invention.

Figure 1:
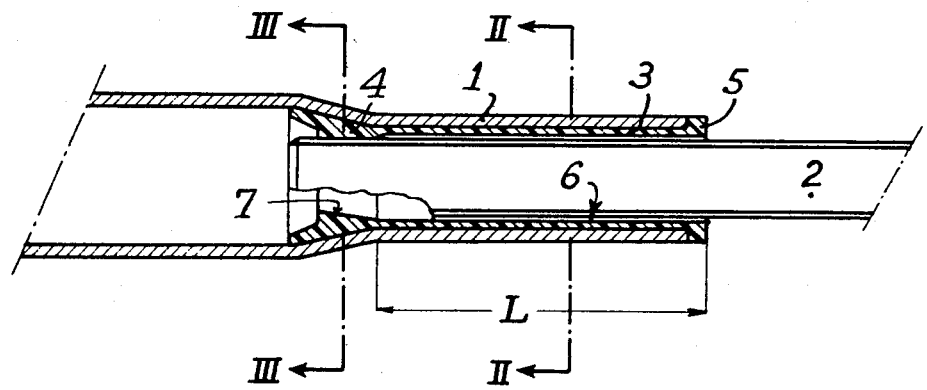
FIG. 1 is a partial sectional view of a device according to the invention.
Figure 3:
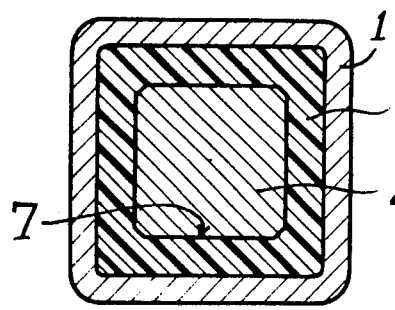
FIGS. 2 and 3 are sections along II—II and III—III respectively of FIG. 1.
Figure 2:
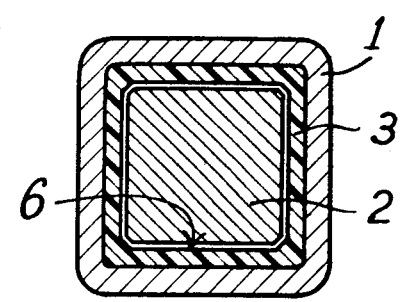

Referring now to the drawings, FIGS. 1, 2 and 3 show a female sleeve 1, capable of cooperating with a male shaft 2 in order to drive in rotation one of the two members by means of the other.

In fact, in the embodiment chosen, the shaft 2 has a square section with the four corners cut. The sleeve 1 has a section greater than that of the shaft 2. An intermediate lining 3 is fixed to the internal wall of the sleeve 1 and is held in place, for example by a widened end 4 which abuts on the sleeve 1 and by a flange 5, which is in contact with an end edge of said sleeve 1.

Over a length L of this lining 3, the lining 3 and the shaft 2 have substantially equal sections save for the assembly clearance and are mounted for relative sliding. Beyond this zone of length L, the free section of the lining 3 becomes narrow and smaller than that of the shaft 2. In the present case, at least one of the surfaces, for example lower surface 6, of the lining 3 extends beyond the zone of slide of length L, by a facet 7 which is inclined with respect to the axis of the cylindrical part of length L of the lining and approaches said axis. The inclination may be small, of the order of three degrees for example. The other faces of the lining may, moreover, be similarly extended by facets similar to the facet 7. It will be noted that the lining 3 is preferably made of an elastic material; other particular embodiments could however be different from the preferred embodiment mentioned hereinabove.

The use of a device according to the invention will be specified by means of the diagram of FIG. 4. On this diagram, one axis represents the variations of the angle of rotation of the driving member, shaft 2 for example, by AD for the rotations made in the direct sense and by AI for the rotations made in the opposite sense. The torque transmitted by the driving member is referenced by C and is shown in absolute value on a second axis perpendicular to the first and intersecting it at point O.

This diagram is symmetrical with respect to the axis O–C. A continuous diagram is shown which is constituted by a curve 13a substantially parallel to the axis O—AI and by a curve 14a, firstly substantially parallel to the axis O–C and extending the curve 13a towards the torques C decreasing until point O is reached and by the curves 13b and 14b substantially symmetrical with the curves 13a and 14a with respect to axis O–C.

From the description of the use of the device shown in FIGS. 1, 2 and 3 and mounted for example on the steering column of an automatic vehicle, it will be easier to understand the new advantages that may be achieved by adopting such a device.

Firstly, a telescopic fitting is obtained of the shaft 2 in the sleeve 1 which presents good guide and sliding characteristics. In fact, it is a well-known fact that the clearances that must be made in the assemblies comprising a plastics lining 3 may be small, the making of such a lining 3 being noteworthy by its very good surface states, the faithful reproduction of the dimensions and, consequently, its aptitude for ensuring slides with little friction.

However, it should be especially noted that, in a device according to the invention, the angular and radial clearances which could possibly exist between the shaft 2 and the sleeve 1 are taken up concomittently. This operation is made possible by the tightening exerted by the facet or facets 7 on the shaft 2, when said shaft 2, driven in the lining 3, beyond the zone of sliding of length L, places a stress on the lining 3. It will be noted that, in addition, the zone of the facets 7 ensures a holding stress which facilitates the handling operations which precede the actual use of the device.

Moreover, it may easily be seen from the diagram of FIG. 4 that during a rotation in the direct sense for example, starting from the neutral position, shown by the point O, a progressively increasing torque (curve 14b) is felt, this corresponding to the stressing of the facets 7 of the lining 3 up to a constant torque which is the normal drive torque of one of the members, the sleeve 1 for example, by the other, shaft 2 in the present case, the two members being in contact. Equal values of torques for angles of rotation equal in absolute values would have corresponded to a reverse rotation. In fact, when one of the curves 14a or 14b is passed along, starting from point O, the half-clearance J/2 is taken up and a substantially identical reaction is obtained which is rotated in the direct sense or in the reverse sense, which is what is precisely sought after.

What I claim is:

1. A telescopic device for transmitting rotary movement, comprising, a hollow sleeve, an elongated shaft received within said sleeve for sliding movement with respect thereto, and a lining formed of a deformable elastic material positioned between said sleeve and said shaft and encompassing the periphery of said shaft, said lining being fixed to one of said shaft and sleeve elements and spaced from the other of said shaft and sleeve elements over a first portion thereof to facilitate insertion of said shaft into said sleeve and relative sliding movement therebetween, and one of said lining and the other of said shaft and sleeve elements having an enlargement formed therein for cooperation between said lining and said other element at a second portion of said lining whereby said lining and the other of said shaft and sleeve elements are in frictional locking engagement at said second portion of said lining to permit relative movement therebetween upon application of a predetermined force to one of said shaft and sleeve elements.

2. A telescopic device as defined in claim 1 wherein said other of said shaft and sleeve elements has a predetermined cross-sectional configuration including a plurality of flat surfaces and said lining has a complementary cross-sectional configuration having a complementary flat surfaces spaced from the flat surfaces of said other of said shaft and sleeve elements at the first portion thereof, said lining including, at said second portion thereof, said enlargement which comprises a plurality of inclined facets extending towards and engaging said flat surfaces of said other of said shaft and sleeve elements.

3. A telescopic device as defined in claim 2 wherein said lining is fixed to said sleeve and receives said shaft.

4. A telescopic device for transmitting rotary movement, as in the steering column of a motor vehicle, comprising, a hollow sleeve, an elongated shaft received within said sleeve for sliding movement with respect thereto, and a lining formed of a deformable elastic material mounted in said sleeve and receiving said shaft, said lining having a cross-sectional bore therein which is generally complementary to said shaft, said bore having, at a first portion of said lining, internal dimensions slightly greater than the dimensions of said shaft whereby said lining and shaft are spaced from each other over the first portion of the lining to facilitate insertion of said shaft into said sleeve and relative sliding movement therebetween, said lining having enlarged facets formed there in at a second portion thereof extending inwardly towards and into engagement with said shaft whereby said lining and shaft are held in frictional locking engagement at said second portion of the lining to permit relative movement therebetween upon application of a predetermined force to one of said shaft and sleeve elements and to maintain a relatively constant locking force therebetween irrespective of the relative position of said shaft in said sleeve.

5. The telescopic device as defined in claim 4 wherein said shaft has a regular polygonal cross-section having flat faces, said lining having complementary flat facets and said facets cooperating with said flat surfaces at said second portion of said lining.

* * * * *